Patented Sept. 30, 1924.

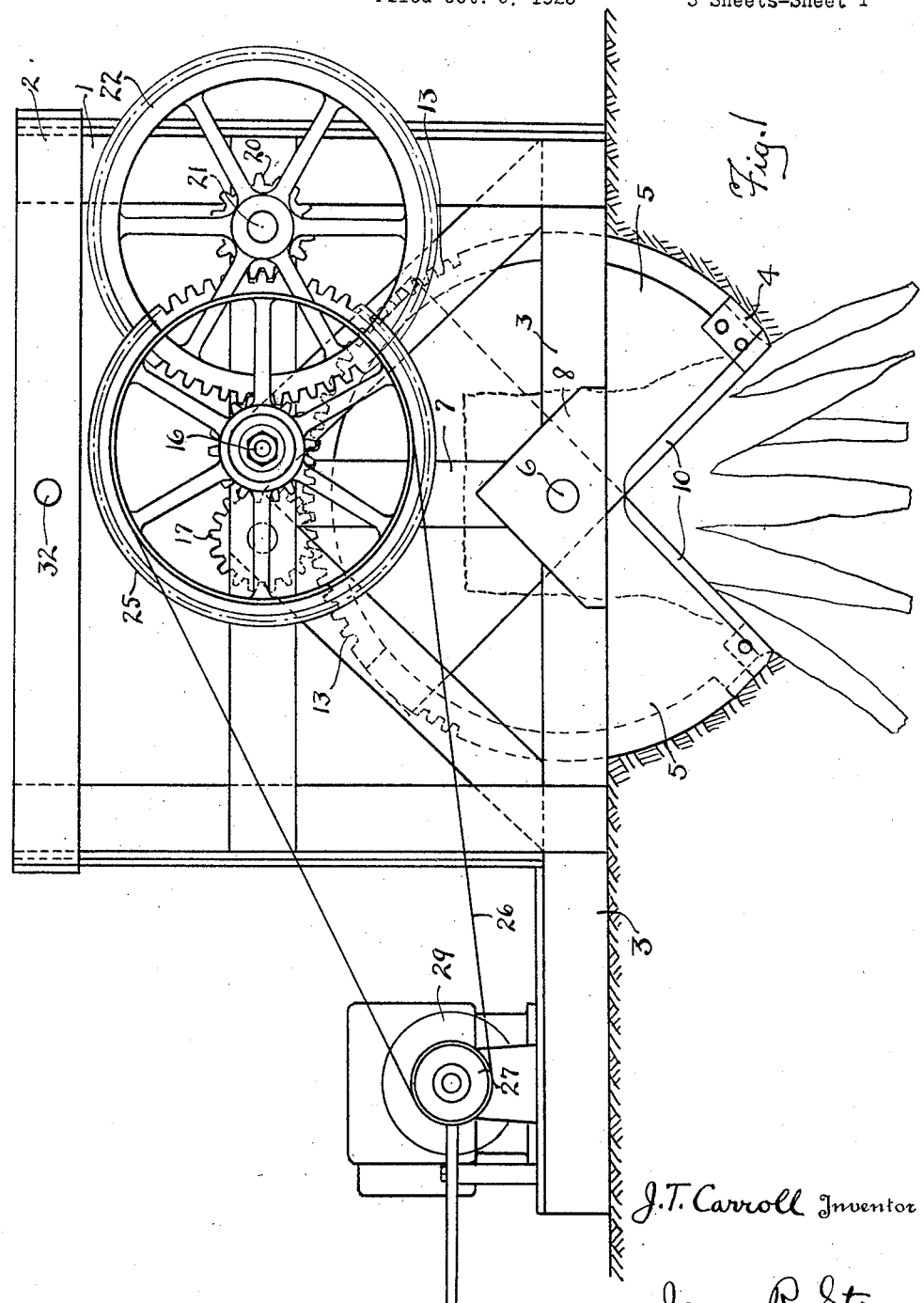

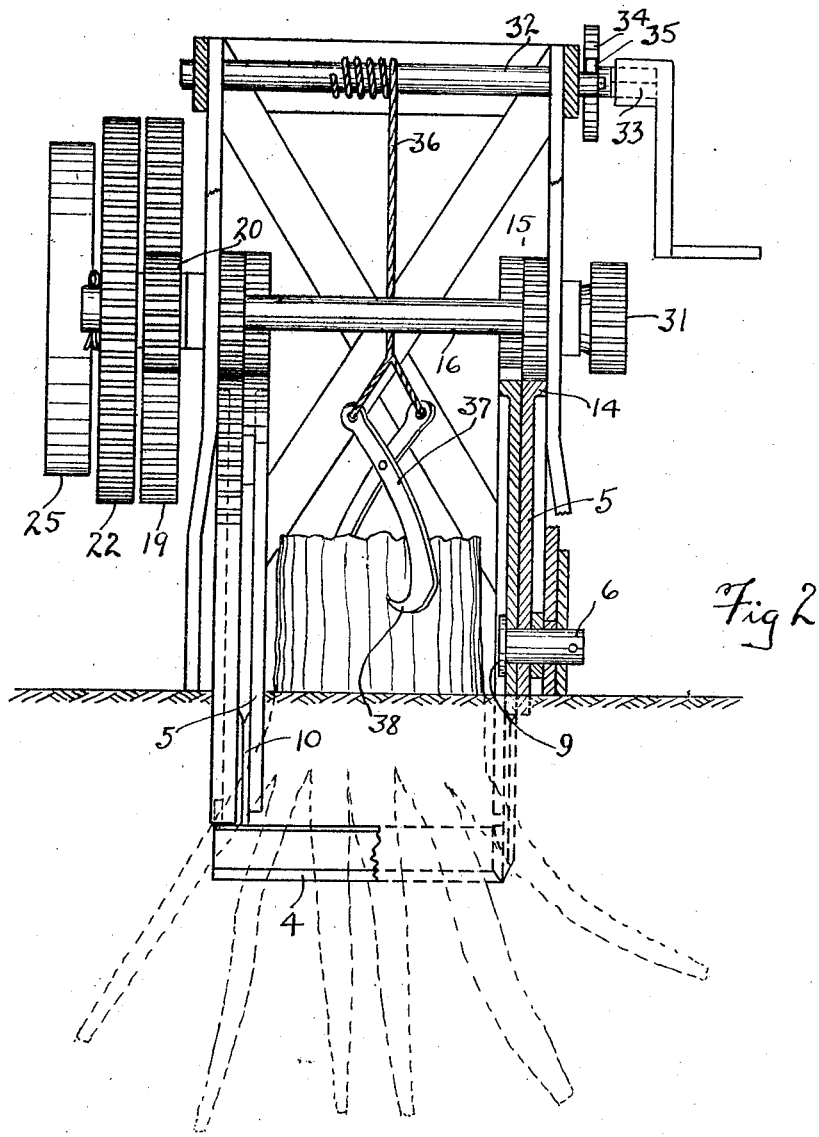

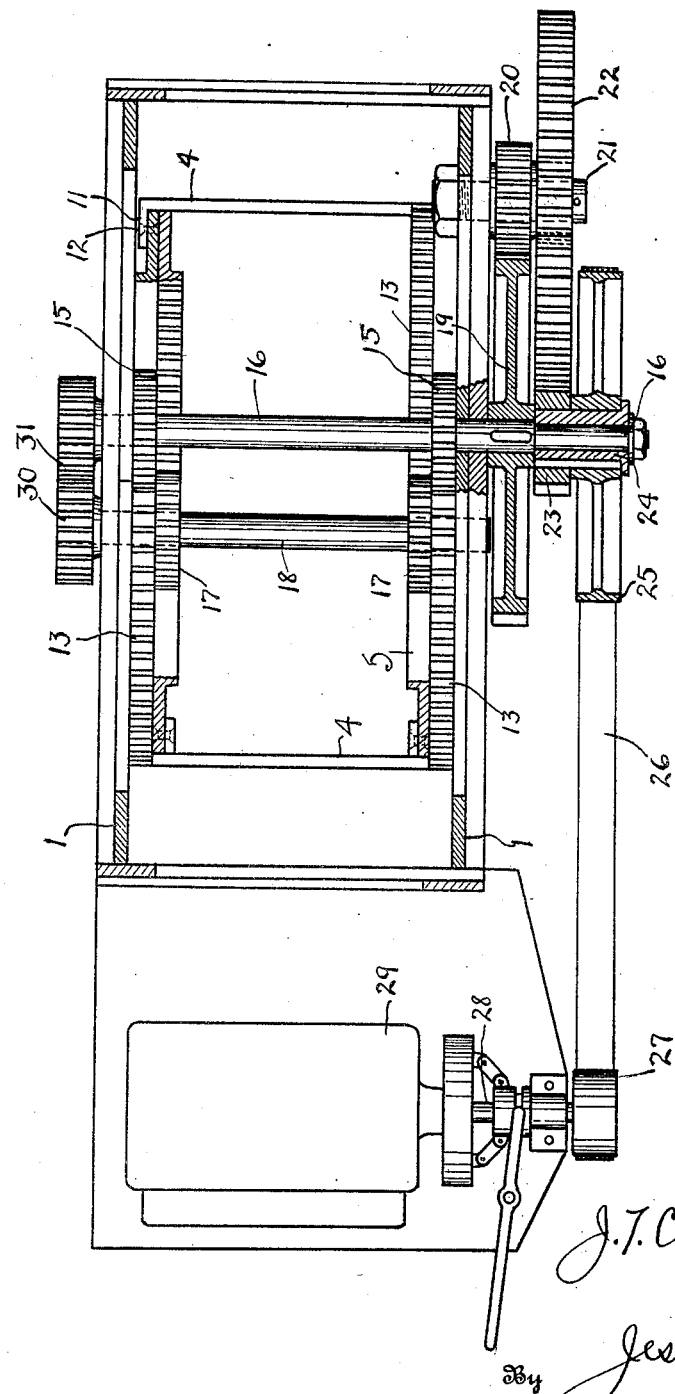

1,509,994

UNITED STATES PATENT OFFICE.

JOHN T. CARROLL, OF HOUSTON, TEXAS.

STUMP-CUTTING MACHINE.

Application filed October 5, 1923. Serial No. 666,759.

*To all whom it may concern:*

Be it known that I, JOHN T. CARROLL, a citizen of the United States, residing at Houston, Harris County, Texas, have invented a certain new and useful Improvement in Stump-Cutting Machines, of which the following is a specification.

My invention relates to machines for cutting stumps out of the ground.

In removing stumps from cutover lands it is ordinarily necessary to remove the stumps by blasting or by large and expensive means for pulling stumps from the ground.

It is an object of my invention to provide a device which is capable of cutting into the ground on each side of the stump and severing the roots at a point beneath the ground so that the said roots will not interfere with the cultivation of the ground. The part of the stump which is removed will be the most valuable portion thereof for use as fuel or, in case of pine stumps, for turpentine or other products which are obtained through destruction distillation of the pine products contained in the stump.

It is another object of my invention to provide a portable machine which may be readily placed in position adjacent the stump and operated to force cutting knives from opposite directions in the arc of a circle, around the lower portion of the stump, so as to sever the roots with a minimum expenditure of time.

It is another object to provide a means of anchoring the cutting machine in position relative to the stump and to also provide means for raising the stump after it has been severed.

These and other objects and advantages and the means by which the said advantages are obtained will be more clearly understood from the detailed description which follows.

Referring to the drawing herewith, Fig. 1 is a side elevation of my device shown with the knives in cutting position below the surface of the ground; Fig. 2 is an end elevation of my machine, one portion thereof being broken away in vertical section for greater clearness; Fig. 3 is a top plan view, certain portions being cut away in horizontal section for greater clearness. Like numerals of reference are employed to designate like parts in all the views.

In constructing my device, I provide a framework constituting spaced upright frame members 1, 1 at each end, and connecting side members 2, 2 at each side of the device at the upper end. The lower ends of the uprights 1 are connected with a frame work 3 constituting the base, adapted to rest upon the ground and to support the operating machine and the motor by means of which the machine is driven.

The cutting members constituting the main working parts of my machine comprise two separate knives 4, secured to the lower sides of two semi-circular plates 5. With particular reference to Fig. 1, it will be noted that the said plates 5 include slightly more than one-half of a complete circle. The said plates are mounted upon a shaft 6, concentric with the arcuate periphery and secured at the lower end of an upright 7 and also extending through a plate 8 and the base member 3. The shafts 6 are short stub shafts, as shown in Fig. 2, having a head 9 on the inner side and extending through the two semi-circular plates 5, 5. The forward edge of the plates 5 extend beyond the center formed by the shaft, and on the portion adjacent the knife 4 the forward edge of each plate is beveled off at 10 to form a lateral cutting edge on each end plate, which is adapted to cut into the roots of the stumps at the side of the cutting member 4. The knife 4 on each of the sets of plates 5, 5 serves to connect the two supporting plates at each end thereof and to space the said plates rigidly apart. As shown in Fig. 3, the ends of the knife 4 on one set extend beyond the outer of the plates 5 and has the end bent inwardly at 11 to be engaged with the said plates by means of rivets 12, or otherwise. It is to be noted that the sets of plates carry two opposed knives adapted to move toward each other to sever the stump. One pair of said end plates is outside of the other cooperating set for movement on the common axis 6. This construction is shown best in Fig. 3. This allows each of the knives to rotate on its axis independent of the other pair of end plates and the knife supported thereby.

The plates 5 and the knives supported by them are operative to move downwardly into the ground toward the roots of the stump, by means of gears formed upon the upper margins of the two said plates 5. These gears are formed by means of radial teeth 13 formed on the upper quadrant of the circumference of the plates, and for the formation of gears of sufficient width, the plates 5 are made slightly wider at their outer margins, as shown at 14 in Fig. 2. The teeth thus formed upon the plates at each side of the device are adapted to mesh with gears 15, 15 at each end of shaft 16 for one of said knives, and by gears 17, 17 mounted upon shaft 18 for the other of said plates. The shaft 16 engaging with the outermost of the two plates 5 is operated by means of a gear 19 of comparatively large diameter on one end of said shaft, said gear in turn meshing with a smaller gear 20 upon a stub shaft 21. A second gear 22 of comparatively large diameter on the shaft 21 is adapted to mesh with a gear 23 mounted upon a sleeve 24 secured rotatably upon the outer end of the shaft 16. Mounted upon the same sleeve 24, immediately adjacent the gear 23 is a pulley 25 of larger diameter than said gear, said pulley being operatively connected by means of a belt 26 with a pulley 27 upon the shaft 28 of a motor 29. The shaft 18 operating the inner of the two sets of knife-supporting plates is operated through a crown gear 30 at one end thereof, said gear engaging with a gear 31 of equal diameter upon the outer end of the shaft 16 opposite the operating pulley 25.

The operating means thus described is adapted to obtain a large increase of power at the expense of a speed reduction. This power increase is obtained in a very obvious manner, which need not be described in greater detail.

While I have shown my device as mounted upon a portable framework which may be moved bodily from one stump to another, I wish it understood that in actual practice this device may be mounted upon some truck or other means, giving it greater portability and that it may be raised and lowered by any ordinary means now in common use. When the device is set in position over a stump which is to be severed, it is desired to anchor the same firmly to the ground so that the device may not be moved bodily while the knives are engaging the roots of the stump. To accomplish this purpose, I provide at some point adjacent the upper part of the framework of my machine a cross shaft 32, supported in bearings within the framework of the machine. This shaft extends beyond the framework at one side and has thereon a crank 33 or other means by which it may be rotated. This end of the shaft may preferably have thereon a ratchet wheel 34 which may be adapted to be operatively engaged by a pawl 35 by means of which the shaft may be held in the desired position. Mounted centrally upon this shaft 32 is a rope or cable 36, the lower end of which engages with a pair of clamping tongs or cant hooks 37, the lower sharpened ends 38 of which are adapted to engage with the stump to be operated upon, as shown in Fig 2. When the shaft or reel 32 is wound up tightly by means of the crank 33 and the pawl 35 engaged with the rack 34 to hold the same rigidly, it will be noted that the machine will be held firmly downward against the stump so that it may not be forced upwardly by the action of the knives. Furthermore, when the stump has been severed it will be possible to raise the stump somewhat from the ground to allow the removal of the knives by further reeling up on the cable 36.

In the operation of my device, the apparatus will be set in position over the stump with the cutting blades 4 in position opposite each other spaced upwardly from the ground. The motor may then be started so as to rotate the shaft 16 and through the gears 30 and 31 cause a rotation of the shaft 18. The rotation will be in such direction as to throw the knives downwardly into the ground toward each other along the arc of the circle having its center about the two stub shafts 6. The power exerted upon the knives in the arrangement shown and described will be enormous, so that the knives will have a clamping or shearing engagement with the stump, acting somewhat like the jaws of a clam shell bucket, and will move toward each other and entirely sever the roots of the stump, after which the stump may be raised somewhat by means of the cable 36 and the knives withdrawn through the reverse movement of the motor. If desired, the stump may be still further elevated to withdraw it from the ground before the machine is moved on to its position over an adjacent stump where the operation may be repeated.

It will be noted that I have thus provided a device which is simple and strong in construction, and capable of operating with speed and efficiency. It is easily anchored in position, and easily disengaged. It will have few parts, simple in design, and cheap to manufacture.

Having thus described my invention, what I claim as new and desire to protect by Letters Patent is:

1. A stump cutting device comprising a supporting frame, two opposing sets of end plates approximately semi-circular in shape pivotally mounted therein, a knife connecting the lower edges of each said set of plates, knives on the forward edges of said plates, gears on the outer peripheries of said plates and means engaging said gears to rotate said plates and knives toward each other in an arc beneath the stump to sever the roots thereof.

2. A stump cutting device comprising a supporting frame, two sets of opposed cutting knives mounted on segmental end plates pivotally supported on a common axis in said frame and means to rotate said plates and knives to force said knives downwardly in an arc toward each other.

3. A stump cutting device comprising a supporting frame, two opposing sets of segmental gears mounted on a common axis in said frame, knives connecting the lower ends of said gears, and means operatively engaging said gears to rotate them in opposite directions to force said knives downwardly in an arc toward each other for the purpose specified.

4. A stump cutting device comprising a supporting frame, two sets of segmental end plates mounted for rotation therein, knives connecting the lower forward edges of said plates, cutting edges on the forward sides of said plates, and means to rotate said sets of plates to force said knives toward each other in the manner set forth.

5. A stump cutting device comprising a supporting frame, opposite knives, means to support said knives, and means to force said knives in a downward arc toward each other for the purpose set forth.

6. A stump cutting device comprising a supporting frame, arcuate plates mounted to rotate in said frame, cutting means on said plates and means to rotate said plates to force said cutting means in a downward arc in the manner set forth.

7. A stump cutting device comprising a supporting frame, two sets of cutting means mounted to swing in said frame, means to force said cutting means downwardly beneath the stump to sever the same, and means to anchor said frame to the stump.

8. A stump cutting device comprising a supporting frame, two sets of cutting means mounted to swing in said frame, means to force said cutting means downwardly beneath the stump to sever the same, and means to anchor said frame to the stump comprising a windlass on said frame, a cable thereon, means to detachably connect said cable to the stump, and means to hold said windlass and cable in adjusted position.

In testimony whereof I hereunto affix my signature this 24th day of September, A. D. 1923.

JOHN T. CARROLL.